United States Patent
Liu (10) Patent No.: US 9,633,235 B2
(45) Date of Patent: Apr. 25, 2017

(54) DEVICE FOR SAMPLING AND LOCATING ASSET INFORMATION AND METHOD FOR MANAGING THE SAME

(71) Applicant: Digitalor Shenzhen Security Tech Inc., Shenzhen, Guangdong (CN)

(72) Inventor: Quan Liu, Guangdong (CN)

(73) Assignee: DIGITALOR SHENZHEN SECURITY TECH INC., Shenzhen (CN)

( * ) Notice: Subject to any disclaimer, the term of this patent is extended or adjusted under 35 U.S.C. 154(b) by 111 days.

(21) Appl. No.: 14/836,987

(22) Filed: Aug. 27, 2015

(65) Prior Publication Data

US 2016/0321896 A1 Nov. 3, 2016

(30) Foreign Application Priority Data

Apr. 29, 2015 (CN) .......................... 2015 1 0208913

(51) Int. Cl.
*G08B 13/14* (2006.01)
*G06K 7/00* (2006.01)
*G06Q 10/08* (2012.01)

(52) U.S. Cl.
CPC .............. *G06K 7/00* (2013.01); *G06Q 10/08* (2013.01)

(58) Field of Classification Search
CPC ................................ G06K 7/00; G06K 10/08
USPC ............... 340/10.1, 572.1–572.8; 705/22, 28
See application file for complete search history.

(56) References Cited

U.S. PATENT DOCUMENTS

| | | | | |
|---|---|---|---|---|
| 7,350,715 B2* | 4/2008 | Pradhan | .................. | G01S 13/74 235/375 |
| 8,816,857 B2* | 8/2014 | Nordin | ................. | G06K 7/0008 340/572.1 |
| 9,235,823 B2* | 1/2016 | Rushing | ............. | G06Q 10/0833 |
| 2003/0174099 A1* | 9/2003 | Bauer | .................. | G06K 7/0008 340/572.1 |
| 2009/0207022 A1* | 8/2009 | Reckeweg | ........... | G06K 7/0008 340/572.1 |
| 2011/0050422 A1* | 3/2011 | Pflueger | ............... | G06Q 10/087 340/572.1 |
| 2014/0091138 A1* | 4/2014 | Nordin | ................. | G06K 7/0008 235/375 |
| 2015/0236512 A1* | 8/2015 | Whitney | ............. | H05K 7/1492 307/80 |

* cited by examiner

*Primary Examiner* — Eric M Blount (57) ABSTRACT

A device for sampling and locating asset information includes a tag and a locator. The tag includes an attaching terminal that comprises an attaching element, a RFID responder, a magnetic element. The tag further includes a fixing end and a flexible connection element. The locator includes an attached element, a RFID reader, a hall switch, a multiplexer and a microprocessor. When a distance between the attaching terminal and the attached element reaches a preset distance, the magnetic element triggers the hall switch to send a trigger signal to the microprocessor. Based on the trigger signal the microprocessor turns on the RFID reader and controls the multiplexer to be connected to the corresponding RFID antenna to read the information. By using the device above, a real time monitoring and an automatic location are realized and the monitoring and the location can be accurate to every unit on the rack.

13 Claims, 9 Drawing Sheets

DEVICE FOR SAMPLING AND LOCATING ASSET INFORMATION AND METHOD FOR MANAGING THE SAME

CROSS-REFERENCES TO RELATED APPLICATION

This application claims the benefit of Chinese Patent Application No. 201510208913.7 filed on Apr. 29, 2015, the contents of which are hereby incorporated by reference.

TECHNICAL FIELD

The present application relates to a technical field of asset management, and more particularly, relates to a device for sampling and locating asset information and a method for managing the asset information.

BACKGROUND

With the development of society and technology, RFID has been widely used in various fields, such as sampling and managing the asset information. A data center is generally a limited area where many servers are placed. In a big data center, dozens of servers are placed on one rack and there are usually thousands of racks. Therefore, sampling and locating of the asset information is needed in such big data center.

RFID (radio frequency identification) technology has the characteristics of a far reading distance, strong penetrability, anti-pollution, high efficiency (many tags can be handled at the same time), informative information. Based on the above characteristics of RFID, RFID tags are added to the fixed asset such as racks and its internal devices. Then combing with the asset managing and monitoring platform, a full visibility of the asset and a real time update of information can be realized, and meanwhile, the use and the flow of the asset can be monitored in time. In the device for sampling and locating asset information of the prior art, every device is equipped with a RFID tag, then the RFID reader installed inside the cabinet continuously emits electromagnetic wave to detect if there are RFID responders in the area, and uploads the responsive information of the RFID responder to the asset management server.

In the prior art, the device for sampling and locating asset information can not accurately determine the location of the responsive RFID responder and cannot accurately provide it automatic and real-time location on the rack. Besides, due to the strong electromagnetic interference inside the room, after being used for a while the tag can not accurately be detected or even cannot be detected. Meanwhile, in the prior art, the RFID reader needs to continuously emit electromagnetic wave to detect if there are RFID responders in the area. But there are dozens of RFID on one rack and thousands of RFID are working together in the data center, which also causes electromagnetic interference to the operation of the server. Because the metal has a strong electromagnetic field shielding, the RFID will be affected in the data center with metal racks and servers of metal housing, and therefore the device for sampling and locating asset information by means of space coupling cannot continuously and stably work within the rack. Besides, in the prior art, a field-investigation to the racks is required, and the professional engineers need to design a specific project solution, construct the project, precisely debug and test it, which bring problems of complex process, poor product adaptability and high cost for installation and maintenance.

The real-time performance and the accuracy of the asset and the location information are key points of improving the operational quality and efficiency of the whole data center. Therefore, a standardized, simply installed, easy operated, stable and reliable device for sampling and locating asset information which can atomically sampling the asset information and the asset information with low costs for installation and maintenance, is urgently needed.

BRIEF SUMMARY

The present application is to provide a device for sampling and locating asset information in real-time which can make the identification quickly and accurately, can be simply and conveniently installed, can have nice user experience and low costs for installation and maintenance.

In accordance to one aspect of the present application, a device for sampling and locating asset information is provided, which including a tag, and a locator disposed on a rack for placing asset and communicated with an asset management server, wherein, the tag includes an attaching terminal comprising an attaching element, a RFID responder and a magnetic element disposed in the attaching element, wherein, the RFID responder is configured to store sampled information of the asset. The tag further includes a fixing end configured to fix the tag to the asset whose information would be sampled, and a flexible connection element connecting between the fixing end and the attaching terminal. The locator includes an attached element, a RFID reader, a hall switch, a multiplexer and a microprocessor. The attached element cooperates with the attaching element to guide the attaching terminal and to maintain a stable position relationship between the RFID reader and the RFID responder. The hall switch and the RFID reader are electronically connected to the microprocessor respectively, the RFID reader is electronically connected to the multiplexer, and the multiplexer is connected to a plurality of RFID antennas. When a distance between the attaching terminal of the tag and the attached element of the locator reaches a preset distance, the magnetic element on the attaching terminal triggers the hall switch to send a trigger signal to the microprocessor. Based on the trigger signal the microprocessor turns on the RFID reader and meanwhile controls the multiplexer to be connected to corresponding RFID antenna to read the sampled information of the asset stored in the RFID responder.

Preferably, when the hall switch detects that the magnetic element is leaving, a leaving information is sent to the microprocessor which then uploads the leaving information to the asset management server.

Preferably, the attaching element and the magnetic element are made of permanent magnet, the RFID reader sends read information to the microprocessor which then uploads the read information to the asset management server.

Preferably, the tag is made of plastic materials which can be nylon materials in specific. Preferably, the fixing end, the flexible connection element and the attaching terminal are an integral forming structure.

Preferably, the tag further includes an alarm circuit for interruption prevention disposed in the fixing end, the flexible connection element and the attaching terminal. The alarm circuit for interruption prevention is connected to the microprocessor for sending out an alarm signal when the fixing end or the flexible connection element or the attaching terminal is detected to be disconnected. A self-destruction circuit connected to the microprocessor is further disposed in the fixing end and is used to send out the alarm signal when the fixing end is detected to be disconnected from the asset.

Preferably, the microprocessor is configured to turn on the RFID reader in a preset interval for detecting if the alarm circuit for interruption prevention and the self-destruction circuit send out the alarm signal. The microprocessor is configured to upload the alarm signal to the asset management server when the alarm signal is detected.

Preferably, the attached element includes an iron block or a magnet arranged on a central axis of the locator.

Preferably, a locator group with an input terminal and an output terminal is formed by at least one locator, and a number of the locator is determined by the number of units on the rack.

Preferably, a SATA interface used to connect the locator is employed as the input terminal and the output terminal of the locator group, and a magnetic strip is set on one side of the locator group for fixing the locator group to the rack arranged to place the asset.

Preferably, the locator further includes at least one indicator.

In accordance to another aspect of the present application, a method for managing asset information is provided, wherein, comprising:

S1, triggering a hall switch via a magnetic element on an attaching terminal when a distance between the attaching terminal of a tag and an attached element of a locator reaches a preset distance;

S2, sending a trigger signal to a microprocessor via the hall switch;

S3, based on the trigger signal, turning on a RFID reader and connecting a multiplexer to a corresponding RFID antenna to read sampled information of the asset stored in a RFID responder via the microprocessor.

Preferably, when the hall switch detects that the magnetic element is leaving, a leaving information is sent to the microprocessor which then uploads the leaving information to the asset management server and turns off the RFID reader.

When implementing the device for sampling and locating asset information and method of the present application, the following advantageous effects can be achieved. In the present application, when a tag with an attaching terminal gets close to a locator, a hall switch in the locator is triggered to make the microprocessor turn on the RFID reader, and the RFID reader is closed after the task is completed. Thus the information of the neighboring tags will not be misread and the neighboring interferences are solved. Besides, since the RFID reader is turned off when no asset is changed and the RFID reader just needs to work for a short period (about 200 ms) and does not need to emit electromagnetic waves in the rest time, the energy is saved and the electromagnetic interference to the servers is reduced furthest, as the electromagnetic interference is caused by many RFID readers working together. The asset can be easily and repeatedly moved out of the rack or put into the rack by means of the magnetic attaching element of the present application, thus the state of the asset on the rack can be conveniently, atomically and actually tracked. By means of the attaching element disposed on the tag, the attached element disposed on the locator and the flexible connection element disposed on the tag, the attaching terminal of the tag can be automatically and preciously connected to the locator, which solves the problems of poor product adaptation and a low degree of standardization caused by the requirement of precise constructions and debugging. Because of the magnetic force between the attaching element and the attached element, the RFID reader is stably connected to the RFID responder at close range, making the device for sampling and locating asset information of the present application stably work in the data center with strong electromagnetic interference. Additionally, by means of placing a tag and an independent RFID reader on every unit that is configured to place the servers, a real time monitoring and an automatic location are realized and the monitoring and the location can be accurate to every unit on the rack. The problem of high cost is solved by means of a simple structure and a simple process. In short, the following problems are all solved by the present application: the low efficiency and the inaccurate data caused by the prior art which needs to use a manual scan system and barcodes when managing the asset, the fuzzy positioning, the poor working stability, the complex installation, a low degree of standardization, the interfere with the user equipment.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

To make the technical feature, objective and effect of the present application be understood more clearly, now the specific implementation of the present application is described in detail with reference to some of the accompanying drawings and embodiments. Based on the embodiments of the present application, all other embodiments obtained by the skilled person in the art by making no creative effort, are within the scope of the present application.

Traditional asset tracking systems in data centers are realized by means of barcodes, manual scan systems and regular inspections and cause the following problems, such as heavy workload, high labor cost, information entry errors, unable to update the information in time.

Figure 9:
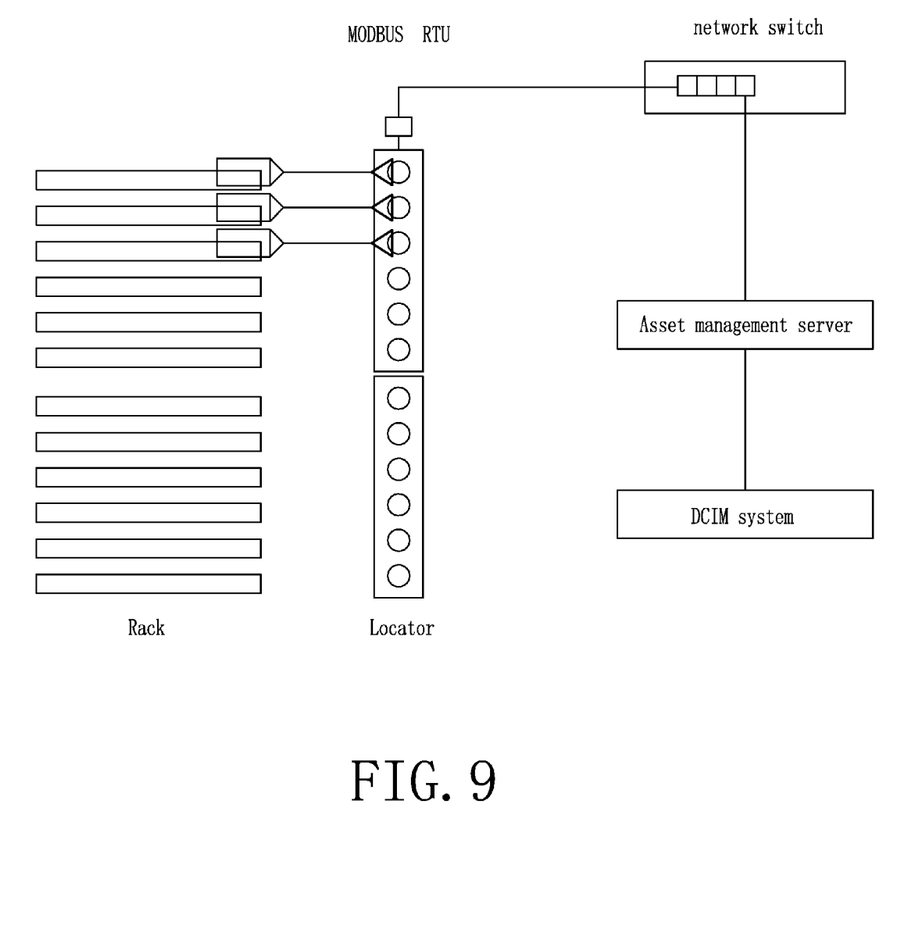
FIG. 9 is principle diagram of the device for sampling and locating asset information according to the present application.

As shown in FIG. 9, the device for sampling and locating asset information of the present application can be seamlessly connected to the asset managing system, by means of series-connected modules and the magnetic RFID technology, so that the field installation is simplified and is more reliable. Moreover, the automatic positioning technology that can accurately position the unit on the rack can be provided. Besides, when the asset is moved, it can be automatically detected, and thus the automatically managing to the data center can be realized.

As shown in FIGS. 1-5 and 10, the device for sampling and locating asset information of the present application includes a tag 1 and a locator 2. The locator 2 is connected to an asset management server and is disposed on a rack which is used to place the asset. The locator 2 can be disposed in the front or on the side or the back of the rack. The tag 1 comprises a fixing end 13, a flexible connection element 12 and an attaching terminal 11. The fixing end 13 is configured to fix the tag 1 to the asset, and specifically the fixing end 13 of the tag 1 can be fixed to the asset by means of a fragile label. The flexible connection element 12 is configured to connect the fixing end 13 and the attaching terminal 11. The attaching terminal 11 includes a RFID responder 112, an attaching element 111 and a magnetic element. The sampled information of the asset is stored in the RFID responder 112. The sampled information of the asset is the unique ID in the tag or the asset information stored in the RFID responder. The magnetic element and the attaching element 111 are made of permanent magnet. Preferably, an alarm circuit for interruption prevention is included in the tag 1. The alarm circuit for interruption prevention can be disposed in the fixing end, the flexible connection element and the attaching terminal. The attaching terminal 11, the flexible connection element 12 and the fixing end 13 are integral forming structure and the alarm circuit for interruption prevention 14, the RFID responder 112, the magnetic element and the attaching element 111 are packaged inside the integral forming structure. The alarm circuit for interruption prevention is connected to the microprocessor and is used to send out an alarm signal when the fixing end or the flexible connection element or the attaching terminal is detected to be interrupted. A self-destruction circuit (not shown) connected to the microprocessor is further disposed in the fixing end and is used to send out the alarm signal when the fixing end is detected to be disconnected from the asset fixing end. The microprocessor is configured to turn on the RFID reader in a preset interval (3-5 seconds in general) and detect if the alarm circuit for interruption prevention and the self-destruction circuit send out the alarm signal, and then is configured to upload the alarm signal to the asset management server when the alarm signal is detected. The molding material includes plastic material etc., and nylon material is preferred. The stability of the above structure is enhanced by means of the integrally formed tag 1, and the tag1 can be used more than once without being destroyed.

Figure 1:
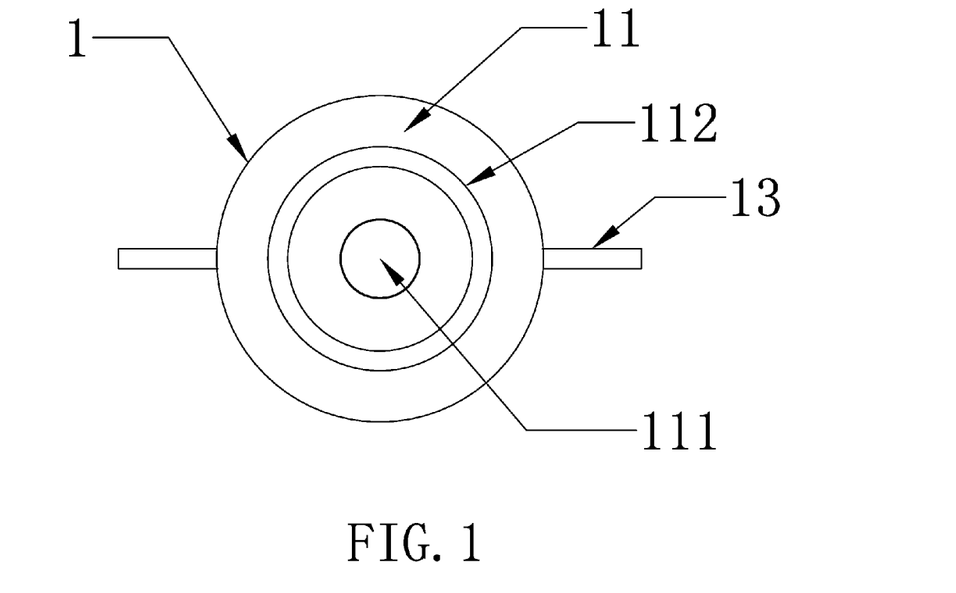
FIG. 1 is a left side view of the tag in the device for sampling and locating asset information according to the present application.
Figure 2:
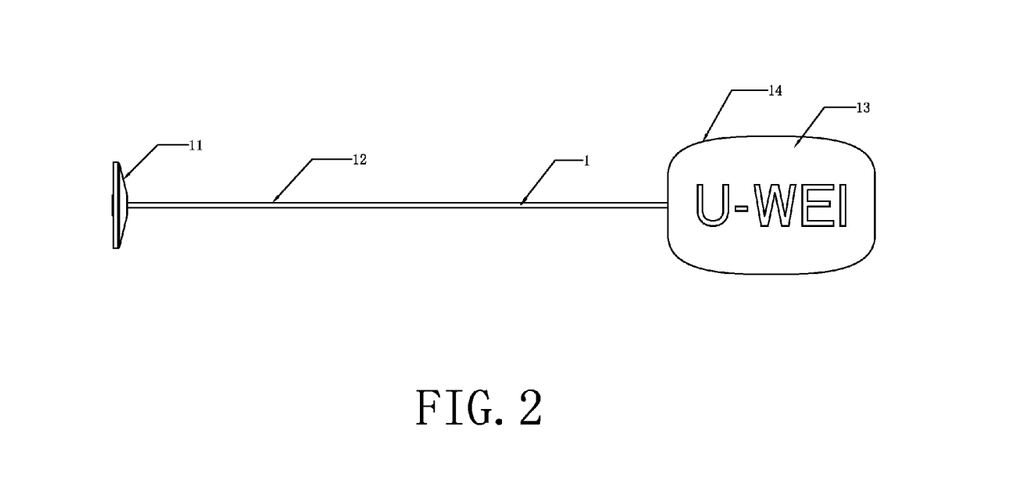
FIG. 2 is a front view of the tag in the device for sampling and locating asset information according to the present application.
Figure 3:
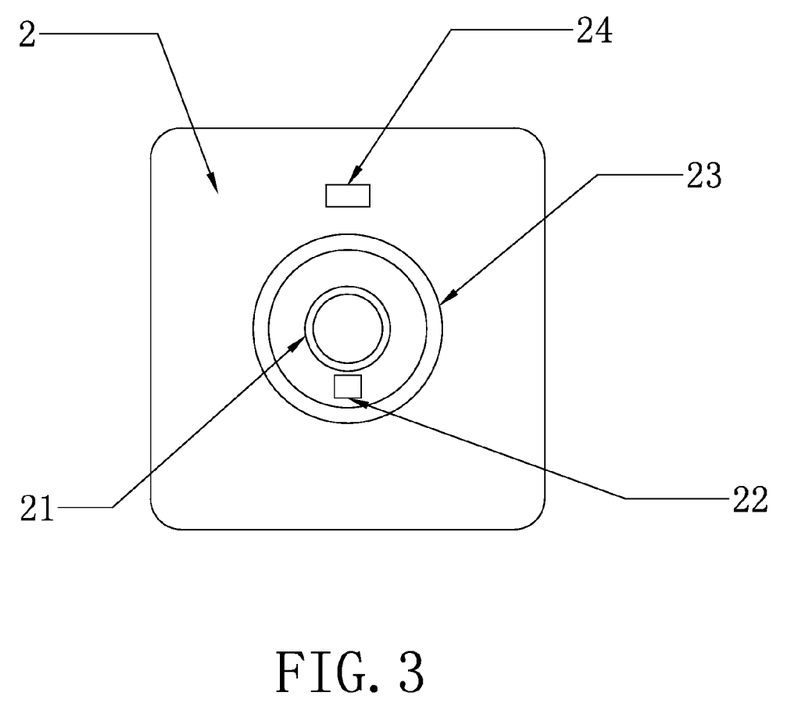
FIG. 3 is a front view of the locator in the device for sampling and locating asset information according to the present application.
Figure 4:
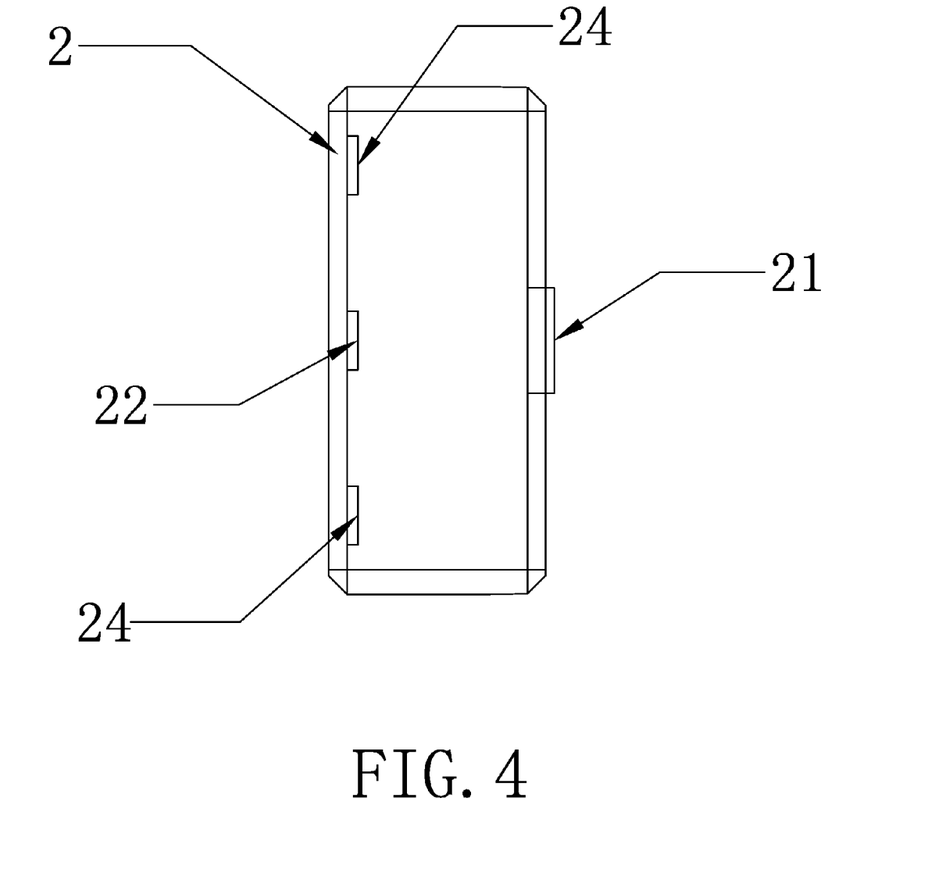
FIG. 4 is a left side view of the locator in the device for sampling and locating asset information according to the present application.
Figure 5:
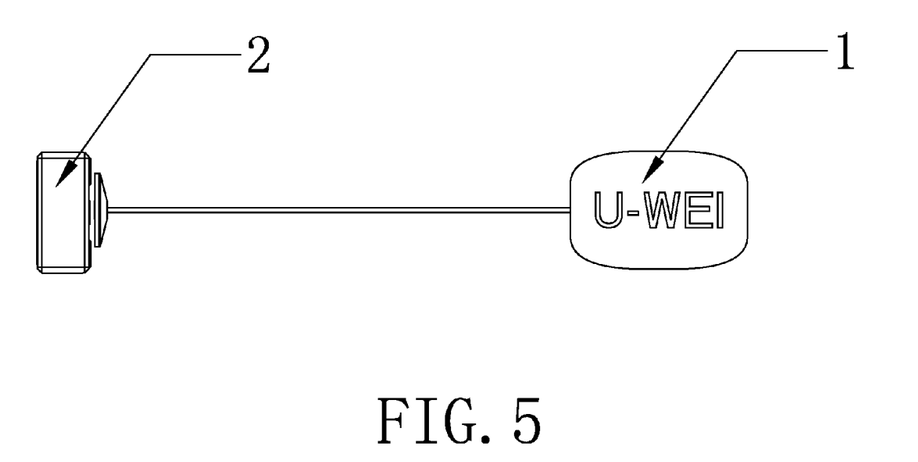
FIG. 5 is a using state diagram of the device for sampling and locating asset information according to the present application.
Figure 10:
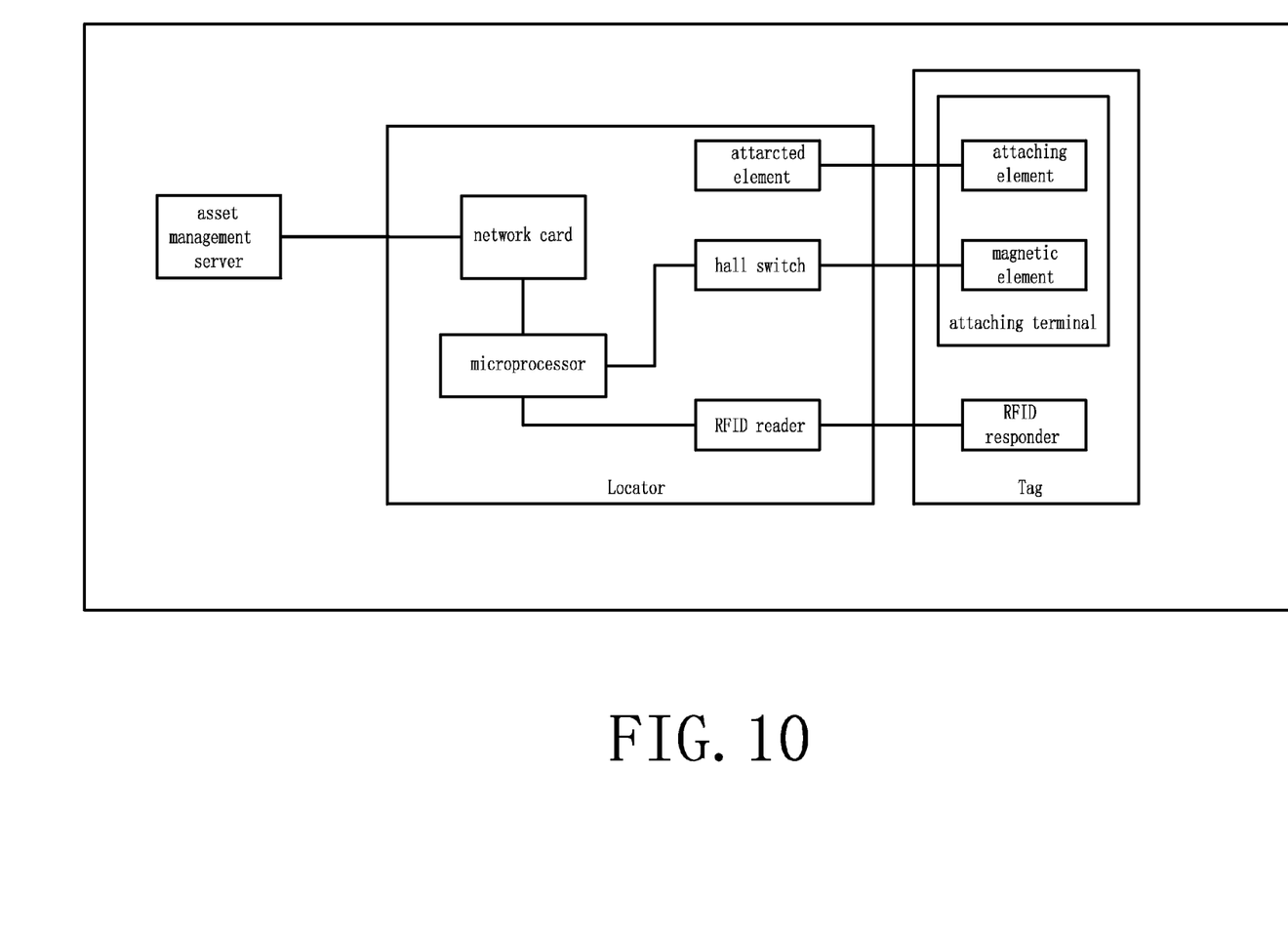
FIG. 10 is a working principle diagram of the device for sampling and locating asset information according to the present application.

The locator 2 includes an attached element 21, a RFID reader 23, a multiplexer (not shown), a microprocessor, a hall switch 22 and indicators. The hall switch 22 and the RFID reader 23 are electronically connected to the microprocessor and the asset management server respectively. The RFID reader is electronically connected to the multiplexer, the multiplexer is connected to a plurality of RFID antennas (not shown). When a distance between the tag and the locator reaches a preset distance, the magnetic element triggers the hall switch. The hall switch sends a trigger signal to the microprocessor, and based on the trigger signal the microprocessor turns on the RFID reader and controls the multiplexer to be connected to the corresponding RFID antenna. The RFID reader 23 reads the sampled information of the asset stored in the RFID responder 112. The RFID reader just needs 0.1 second to read the information of the asset and then the read information are sent to the microprocessor, and the microprocessor uploads the information to the asset management server. In the present application, the hall switch is configured to detect if the magnetic field changes or not when the tag is getting close to the asset. And if the magnetic field changes, the RFID reader 23 is turned on. Thus the information of the neighboring tags will not be misread and the neighboring interferences are solved. When the magnetic field is not changing, the microprocessor will not turn on the RFID reader 23. But in the prior art the RFID reader r23 needs to continuously transmit radio signals to detect if the RFID responder 112 is in the reading area, thus causing problems of high energy consumption, a faster aging speed of devices and more faults. All the above problems are solved by present application. Furthermore, the energy consumption of the present application is only one-tenth of the energy consumption of existing methods, thus generating significant economic effects and environmental effects. Besides, since the RFID reader just needs to work for a short period and does not need to emit electromagnetic waves in the rest time, the energy is saved and the electromagnetic interference to the servers is reduced furthest, as the electromagnetic interference is caused by many RFID readers working together. Further, the electromagnetic interference to the servers can be reduced to a thousandth of the past.

When the hall switch 22 detects that the magnetic element is leaving, the hall switch 22 sends the leaving information to the microprocessor, and the microprocessor uploads the leaving information to the asset management server without restarting the RFID reader 23. The attached element 21 can guide the attaching element 111 within 10 mm-20 mm to cooperate with itself, so as to maintain a stable position between the RFID reader 23 and the RFID responder 112. Because of the magnetic force between the attaching element 111 and the attached element 21, the RFID reader 23 is stably connected to the RFID responder 112 at close range, making the device for sampling and locating asset information of the present application stably work in the data center with strong electromagnetic interference. By means of the attaching element 111 disposed on the tag, the attached element 21 disposed on the locator 2 and the flexible connection element 12 disposed on the tag 1, the attaching terminal 11 of the tag 1 can be automatically and preciously attached to the locator 2, which solves the problems of poor product adaptation and a low degree of standardization caused by the requirement of precise constructions and debugging. The attached element 21 can be an iron block or a permanent magnet. At least one indicator is disposed on the front of the locator 2. The indicator is connected to the microprocessor and is configured to indicate the state of the asset on the present unit. The indicator can indicate if the locator 2 is working with the tag 1 and can be set to different states such as always-on, always-off, flashing etc. The asset can be easily and repeatedly moved out of the rack or put into the rack by means of the magnetic attaching element of the present application, thus the state of the asset on the rack can be conveniently, atomically and actually detected.

Figure 6:
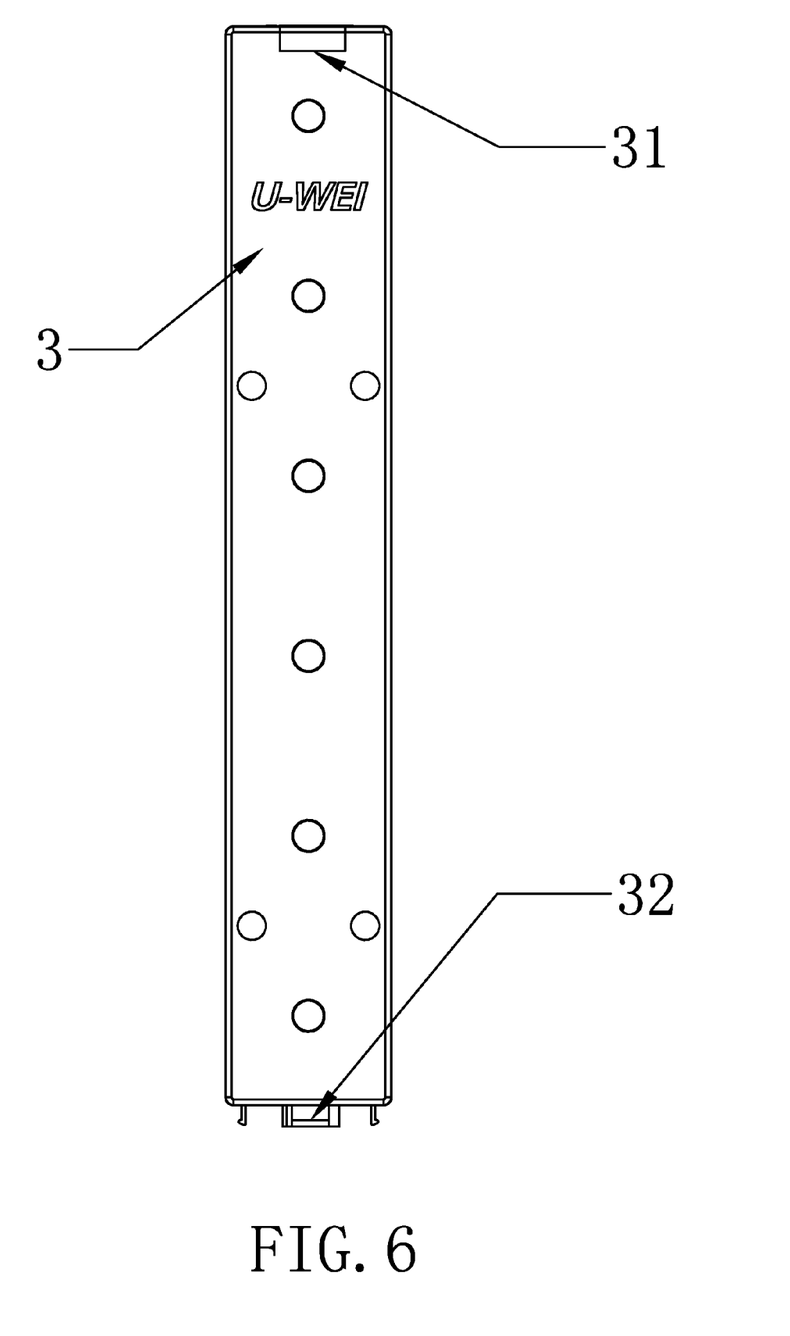
FIG. 6 is a front view of the locator group in the device for sampling and locating asset information according to the present application.

Further, as shown in FIG. 6, according to the actual needs, a number of locators 2 can be grouped into a locator group 3. The locator group 3 can include any number of locators, for example, 2 locators, 3 locators or 6 locators. According to the stander of the present rack and the number of the units, the locator group 3 usually includes 6 locators. According to different situation, another locator group 3 including 2 or 3 locators can be used together.

Figure 7:
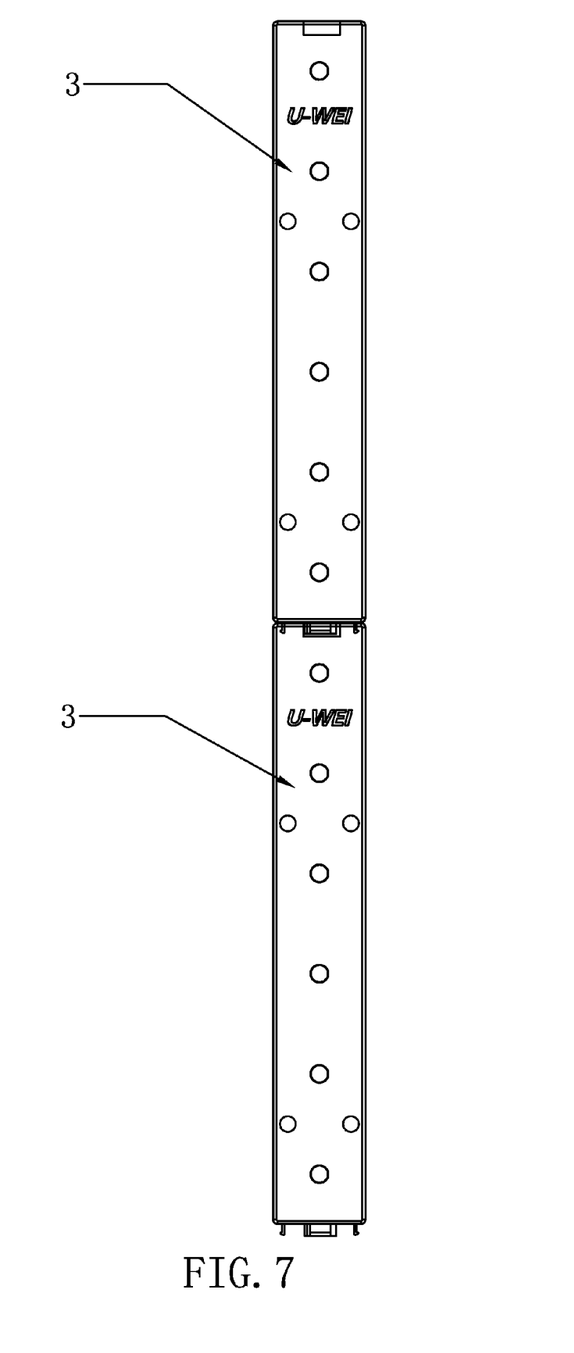
FIG. 7 is a front view of the combination state of the locator groups in the device for sampling and locating asset information according to the present application.
Figure 8:
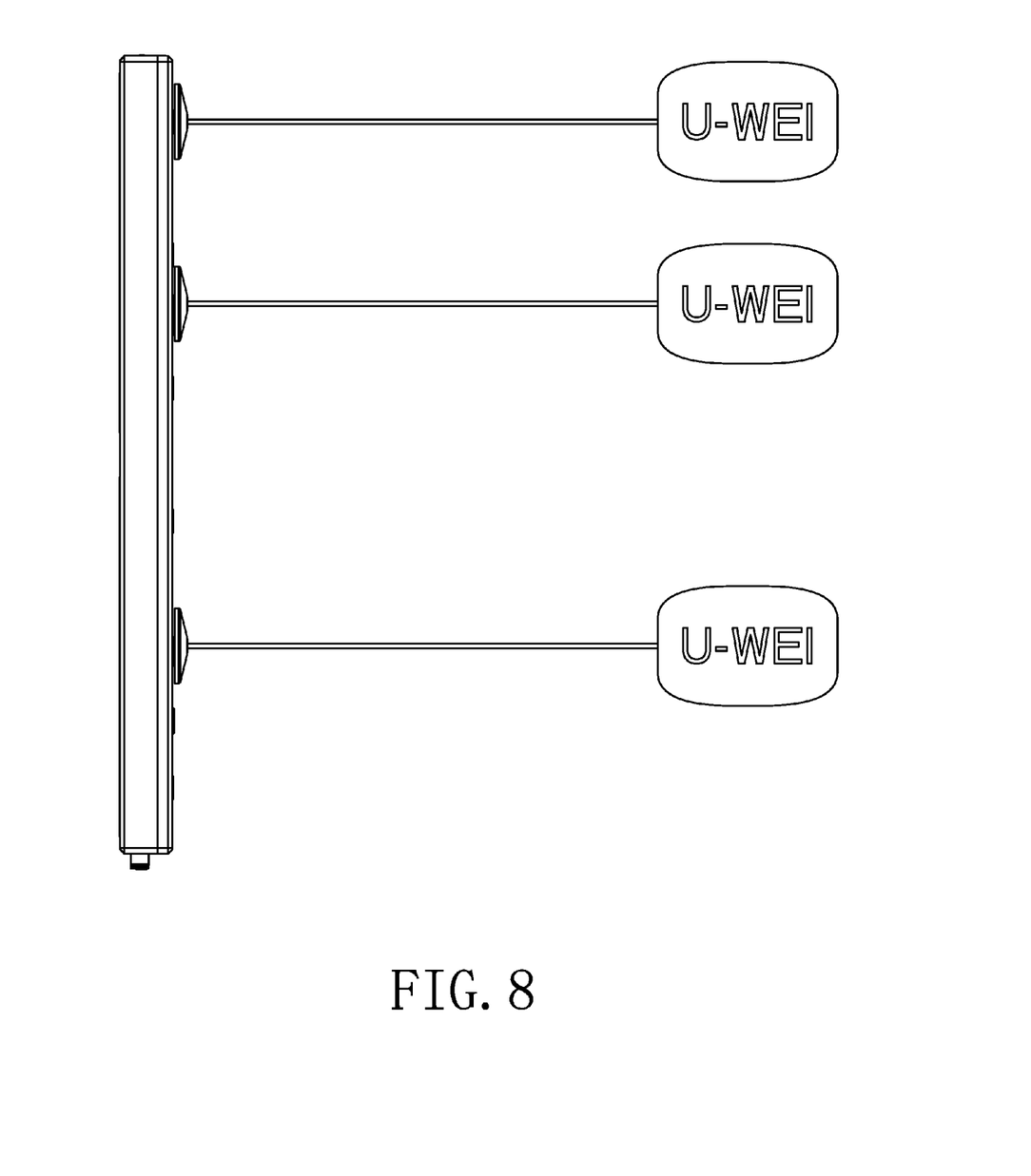
FIG. 8 is a using state diagram of the locator group and the tag in the device for sampling and locating asset information according to the present application.

As shown in FIGS. 7 and 8, an input terminal 31 and an output terminal 32 are disposed on the locator group 3. Specifically, a SATA interface is employed as the input terminal 31 and the output terminal 32. The SATA interface is used to connect the locators in the locator group. A magnetic strip is set on one side of the locator group 3 and is used to fix the locator group 3 to the rack arranged to place the asset. In this way, the device for sampling and locating asset information is easy to be installed and debugged, thus a lot of labor cost can be saved.

The present application further provides a method for managing asset information, and comprises the following steps.

In steps S1, when a distance between an attaching terminal of a tag and an attached element of a locator reaches a preset distance, a magnetic element on the attaching terminal triggers a hall switch on the locator.

In steps S2, the hall switch sends a trigger signal to the microprocessor electronically connected to the hall switch.

In steps S3, based on the trigger signal, the microprocessor turns on a RFID reader on the locator and controls a multiplexer to be connected to a corresponding RFID antenna to read the information of the asset stored in a RFID responder.

Further, when the hall switch detects that the magnetic element is leaving, a leaving information is sent to the microprocessor which then uploads the leaving information to the asset management server and turns off the RFID reader.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

The invention claimed is:

1. A device for sampling and locating asset information including a tag, and a locator disposed on a rack for placing asset, wherein, the tag includes an attaching terminal comprising an attaching element, a RFID responder and a magnetic element disposed in the attaching element, wherein, the RFID responder is configured to store sampled information of the asset, wherein the tag further includes a fixing end configured to fix the tag to the asset whose information would be sampled, and a flexible connection element connecting between the fixing end and the attaching terminal; wherein the locator includes an attached element, a RFID reader, a hall switch, a multiplexer and a microprocessor, the attached element cooperates with the attaching element to guide the attaching terminal and to maintain a stable position relationship between the RFID reader and the RFID responder, the hall switch and the RFID reader are electronically connected to the microprocessor respectively, the RFID reader is electronically connected to the multiplexer, and the multiplexer is connected to a plurality of RFID antennas; wherein when a distance between the attaching terminal of the tag and the attached element of the locator reaches a preset distance, the magnetic element on the attaching terminal triggers the hall switch to send a trigger signal to the microprocessor, wherein based on the trigger signal the microprocessor turns on the RFID reader and meanwhile controls the multiplexer to be connected to corresponding RFID antenna to read the sampled information of the asset stored in the RFID responder.

2. The device for sampling and locating asset information according to claim 1, wherein, when the hall switch detects that the magnetic element is leaving, a leaving information is sent to the microprocessor which then uploads the leaving information to an asset management server.

3. The device for sampling and locating asset information according to claim 2, wherein, the attaching element and the magnetic element are made of permanent magnet, wherein the RFID reader sends read information to the microprocessor which then uploads the read information to the asset management server.

4. The device for sampling and locating asset information according to claim 3, wherein, the tag is made of plastic materials, wherein the fixing end, the flexible connection element and the attaching terminal are integral forming structure.

5. The device for sampling and locating asset information according to claim 4, wherein, the plastic materials include nylon materials.

6. The device for sampling and locating asset information according to claim 4, wherein the tag further includes an alarm circuit for interruption prevention disposed in the fixing end, the flexible connection element and the attaching terminal, wherein the alarm circuit for interruption prevention is connected to the microprocessor for sending out an alarm signal when the fixing end or the flexible connection element or the attaching terminal is detected to be disconnected, wherein a self-destruction circuit connected to the microprocessor is further disposed in the fixing end and is used to send out the alarm signal when the fixing end is detected to be disconnected from the asset.

7. The device for sampling and locating asset information according to claim 6, wherein the microprocessor is configured to turn on the RFID reader in a preset interval for detecting if the alarm circuit for interruption prevention and the self-destruction circuit send out the alarm signal, wherein the microprocessor is configured to upload the alarm signal to the asset management server when the alarm signal is detected.

8. The device for sampling and locating asset information according to claim 7, wherein the attached element includes an iron block or a magnet arranged on a central axis of the locator.

9. The device for sampling and locating asset information according to claim 8, wherein a locator group with an input terminal and an output terminal is formed by at least one locator, and a number of the locator is determined by the number of units on the rack.

10. The device for sampling and locating asset information according to claim 9, wherein a SATA interface used to connect the locator is employed as the input terminal and the output terminal of the locator group, and a magnetic strip is set on one side of the locator group for fixing the locator group to the rack arranged to place the asset.

11. The device for sampling and locating asset information according to claim 10, wherein the locator further includes at least one indicator.

12. A method for managing asset information comprising:
S1, triggering a hall switch via a magnetic element on an attaching terminal when a distance between the attaching terminal of a tag and an attached element of a locator reaches a preset distance;
S2, sending a trigger signal to a microprocessor via the hall switch;
S3, based on the trigger signal, turning on a RFID reader and connecting a multiplexer to a corresponding RFID antenna to read sampled information of the asset stored in a RFID responder via the microprocessor.

13. The method for managing asset information according to claim 12, wherein further comprises sending a leaving information to the microprocessor which then uploads the leaving information to the asset management server and turns off the RFID reader when the hall switch detects that the magnetic element is leaving.

* * * * *